United States Patent
Asogawa et al.

(10) Patent No.: US 11,071,979 B2
(45) Date of Patent: Jul. 27, 2021

(54) MICROCHIP, LIQUID TRANSFER METHOD AND MICROCHIP CONTROLLING APPARATUS

(71) Applicant: NEC Corporation, Tokyo (JP)

(72) Inventors: Minoru Asogawa, Tokyo (JP); Yasuo Iimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 348 days.

(21) Appl. No.: 15/535,115

(22) PCT Filed: Dec. 14, 2015

(86) PCT No.: PCT/JP2015/084920
§ 371 (c)(1),
(2) Date: Jun. 12, 2017

(87) PCT Pub. No.: WO2016/098722
PCT Pub. Date: Jun. 23, 2016

(65) Prior Publication Data
US 2017/0348690 A1    Dec. 7, 2017

(30) Foreign Application Priority Data
Dec. 15, 2014    (JP) .............................. JP2014-252771

(51) Int. Cl.
*B01L 3/00* (2006.01)
*G01N 35/08* (2006.01)

(52) U.S. Cl.
CPC ... *B01L 3/502746* (2013.01); *B01L 3/502707* (2013.01); *B01L 3/502715* (2013.01);
(Continued)

(58) Field of Classification Search
CPC .. B01L 3/502746; B01L 3/5027; B01L 3/502; B01L 3/50; B01L 3/00
(Continued)

(56) References Cited

U.S. PATENT DOCUMENTS 8,404,192 B2 *   3/2013   Liu ......................... G01N 1/28
                                                422/502
2002/0155010 A1 * 10/2002 Karp .................. F16K 99/0001
                                                417/413.2
(Continued)

FOREIGN PATENT DOCUMENTS

JP    2005-140511 A    6/2005
JP    2006-512092 A    4/2006
(Continued)

OTHER PUBLICATIONS

International Search Report for PCT Application No. PCT/JP2015/084920, dated Feb. 23, 2016.

*Primary Examiner* — Christine T Mui
(74) *Attorney, Agent, or Firm* — Sughrue Mion, PLLC (57) ABSTRACT

A microchip includes a plurality of laminated elastic sheets. Each of the elastic sheets forming a first intermediate layer as an intermediate layer formed with the plurality of elastic sheets have an inadhesive section(s) for forming a first flow path on the first intermediate layer. Each of the elastic sheets for forming a second intermediate layer as an intermediate layer formed with the plurality of elastic sheets have an inadhesive section(s) for forming a second flow path on the second intermediate layer. An elastic sheet(s) interposed between the first and second intermediate layers has a connecting section(s) connecting the first flow path and the second flow path. A flow path width at the connecting section(s) of the first flow path is narrower than a flow path width at the connecting section(s) of the second flow path.

5 Claims, 9 Drawing Sheets

(52) U.S. Cl.
CPC ........ *G01N 35/08* (2013.01); *B01L 2200/027* (2013.01); *B01L 2200/06* (2013.01); *B01L 2300/0816* (2013.01); *B01L 2300/0864* (2013.01); *B01L 2300/0874* (2013.01); *B01L 2300/0887* (2013.01); *B01L 2300/123* (2013.01); *B01L 2400/0421* (2013.01); *B01L 2400/0487* (2013.01); *B01L 2400/086* (2013.01)

(58) Field of Classification Search
USPC .......................................... 422/503, 500, 50
See application file for complete search history.

(56) References Cited

U.S. PATENT DOCUMENTS

| | | | |
|---|---|---|---|
| 2002/0166585 A1* | 11/2002 | O'Connor | F16K 99/0055 137/87.01 |
| 2004/0209354 A1 | 10/2004 | Mathies et al. | |
| 2009/0202391 A1 | 8/2009 | Hagiwara et al. | |
| 2011/0000561 A1* | 1/2011 | Asogawa | B01L 3/502738 137/561 R |
| 2014/0079605 A1 | 3/2014 | Asogawa et al. | |

FOREIGN PATENT DOCUMENTS

| | | |
|---|---|---|
| WO | 2008/004572 A1 | 1/2008 |
| WO | 2009/119698 A1 | 10/2009 |

* cited by examiner

MICROCHIP, LIQUID TRANSFER METHOD AND MICROCHIP CONTROLLING APPARATUS

CROSS-REFERENCE TO RELATED APPLICATION

This application is a National Stage Entry of PCT/JP2015/084920 filed on Dec. 14, 2015, which claims priority from Japanese Patent Application 2014-252771 filed on Dec. 15, 2014, the contents of all of which are incorporated herein by reference, in their entirety. The present invention relates to a microchip, a liquid transfer method and a microchip controlling apparatus, particularly relates to a microchip in which a plurality of elastic sheets are laminated, and a liquid transfer method and a microchip controlling apparatus.

TECHNICAL FIELD

Background

Recently, technology where biochemical reactions required for DNA (Deoxyribo Nucleic Acid) analysis etc. are executed on a microchip has been developed. For example, Patent Literature 1 discloses a microchip in which sheets (plates) comprising elastic member are laminated.

PATENT LITERATURE 1

International Application Publication No. WO2009/119698A

SUMMARY

The disclosure of the above related technical literature is to be incorporated herein by reference thereto. The following analysis is made by the present inventors.

Figure 4:
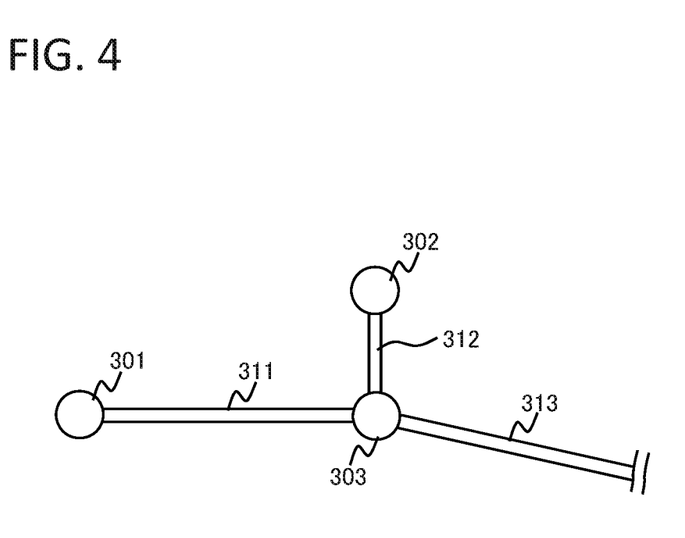
FIG. 4 is a diagram showing concept of a liquid layer and a flow path formed on the microchip.

Referring to, for example, FIG. 4, a microchip for use in DNA analysis etc. comprises solution injection chambers 301 and 302, and a solution reaction chamber 303 connected to the solution injection chambers. Sample and the like required for the DNA analysis is injected into the solution injection chambers 301 and 302.

When the solution injection chamber 301 into which sample has been injected is pressurized from upper side thereof, sample injected into the solution injection chamber 301 is extruded to a flow path 311 formed between the sheets. The extruded sample moves to the solution reaction chamber 303 where it is mixed with the other samples or subjected to a reaction. Similarly, when the solution injection chamber 302 is pressurized, sample injected into the solution injection chamber 302 moves to the solution reaction chamber 303. On the microchip, such sample (liquid) transfer is repeated, to proceed biochemical reactions required for DNA analysis and the like.

Since it is unpreferable that a sample used for DNA analysis leaks, a reverse flow prevention valve is used. Specifically, the reverse flow prevention valve is equipped on tubes for transferring pressurizing medium to the solution injection chambers 301 and 302 and a lid contacting to surface of the microchip. For example, in FIG. 4, the reverse flow prevention valve is equipped on a tube (not shown) for applying pressurizing medium to the solution injection chamber 301 in order to prevent reverse flow of the sample when the solution injection chamber 302 and the solution reaction chamber 303 are pressurized, resulting in leakage of the sample from a DNA analyzing apparatus.

However, in the above construction, there is a case where the sample flows reverse to the reverse flow prevention valve. As a result, there is a possibility of leakage of the sample which has flowed to front of the reverse flow prevention valve.

The present invention aims at providing a microchip, a liquid transfer method and a microchip controlling apparatus contributing to prevention of reverse flow of sample etc.

According to a first aspect of the present invention, there is provided a microchip comprising a plurality of laminated elastic sheets, wherein each of elastic sheets forming a first intermediate layer as an intermediate layer formed by the plurality of elastic sheets comprises an inadhesive section(s) for forming a first flow path on the first intermediate layer, each of elastic sheets forming a second intermediate layer as a intermediate layer formed by the plurality of laminated elastic sheets comprises an inadhesive section(s) for forming a second flow path on the second intermediate layer, an elastic sheet(s) interposed between the first and second intermediate layers comprises a connecting section(s) connecting the first flow path and the second flow path, and a flow path width at the connecting section(s) on the first flow path is narrower than a flow path width at the connecting section(s) on the second flow path.

According to a second aspect of the present invention, there is provided a microchip comprising a plurality of laminated elastic sheets, wherein a plurality of intermediate layers are formed between the plurality of laminated elastic sheets and a first flow path and a second flow path are respectively formed on a first intermediate layer and a second intermediate layer, the first and second flow paths are connected by a connecting section(s) penetrating an elastic sheet interposed between the first and second intermediate layer, the microchip comprises a reverse flow preventing structure which allows liquid transfer from the first flow path to the second flow path through the connecting section(s) and which does not allow liquid transfer from the second flow path to the first flow path through the connecting section(s).

According to a third aspect of the present invention, there is provided a liquid transfer method on a microchip, wherein the microchip comprises a plurality of laminated elastic sheets, a plurality of intermediate layers are formed between the plurality of laminated elastic sheets, a first flow path and a second flow path are respectively formed on a first intermediate layer and a second intermediate layer, the first and second flow paths are connected by a connecting section(s) penetrating an elastic sheet interposed between the first and second intermediate layers, the method comprising: transferring liquid from the first flow path to the second flow path through the connecting section(s), and interrupting liquid transfer from the second flow path to the first flow path.

According to fourth aspect of the present invention, there is provided a microchip controlling apparatus, wherein on the above mentioned microchip, liquid transfer from a first liquid layer connected to the first flow path to a second liquid layer connected to the second flow path is controlled.

According to each aspect of the present invention, there may be provided a microchip, a liquid transfer method and a microchip controlling apparatus contributing to prevention of reverse flow of sample etc.

PREFERRED MODES

First of all, outline of an exemplary embodiment will be explained. Herein, it is noted that symbols in the outline are merely examples to assist in understanding and are not intended to limit the present invention to the mode shown in the outline.

As described above, there are needs for a microchip in which reverse flow of sample etc. is prevented.

Figure 1:
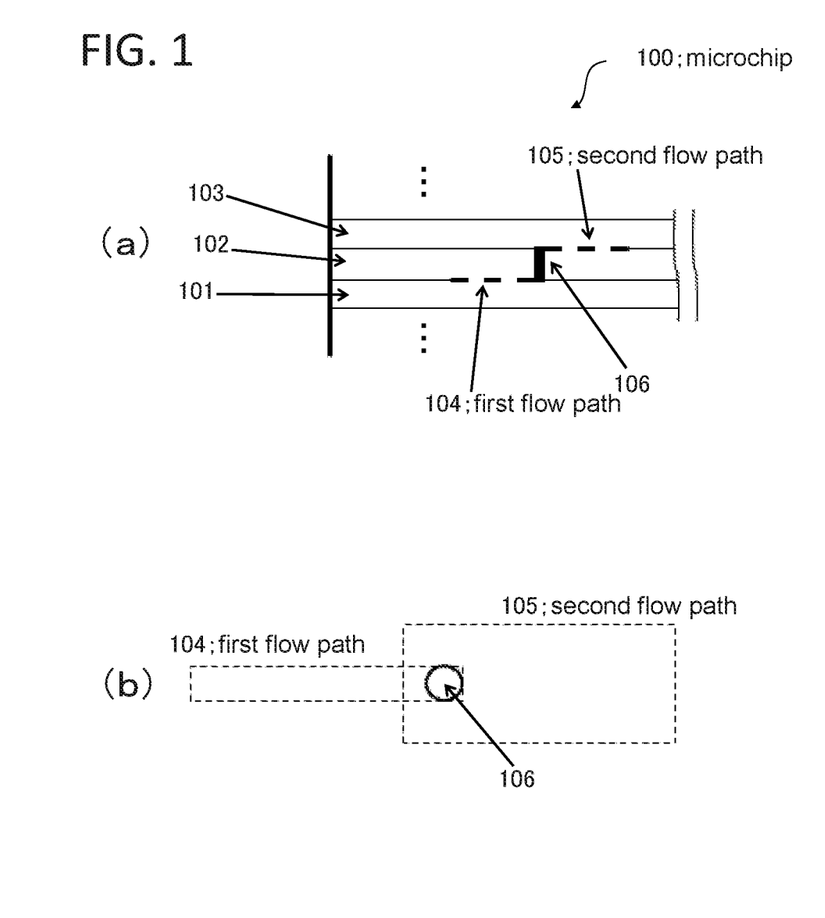
FIG. 1 is an explanatory view of summary of an exemplary embodiment: (a) a sectional view showing summary of an exemplary microchip, (b) a diagram showing two flow paths formed on the exemplary microchip in plan view.

Thus, there is provided a microchip 100 shown in FIG. 1(a) as one example. The microchip 100 comprises a plurality of laminated elastic sheets 101 to 103. Each of elastic sheets 101 and 102 forming a first intermediate layer as an intermediate layer formed by the plurality of elastic sheets has an inadhesive section(s) for forming a first flow path 104 on the first intermediate layer. Each of elastic sheets 102 and 103 forming a second intermediate layer as an intermediate layer formed by the plurality of elastic sheet comprises an inadhesive section(s) for forming a second flow path 105 on the second intermediate layer. The elastic sheet(s) 102 interposed between the first and second intermediate layers comprises a connecting section(s) 106 connecting the first flow path 104 and the second flow path 105. Flow path width at connecting section 106 of the first flow path 104 is narrower than flow path width at the connecting section(s) 106 of the second flow path 105 (see FIG. 1(b)).

As shown in FIG. 1(b), the flow path width at the connecting section 106 of the first flow path 104 is narrower than the flow path width at the connecting section 106 of the second flow path 105. As described in detail below, due to the narrow flow path width at the connecting section 106, strong force is required to flow liquid into the flow path. Contrarily, in a case where flow path width is broader, liquid may flow into the flow path with weak force. Therefore, in a case where force is applied to the liquid at a level capable of forming the first flow path 104, the liquid may flow into the second flow path 105. On the other hand, even in a case where force is applied to the liquid at a level capable of flowing the liquid into the second flow path 105, such force is not always stronger than the force required for flowing the liquid into the first flow path 104. Therefore, in a case where the force is weaker than the force required for flowing the liquid into the first flow path 104, the liquid does not flows into the first flow path 104. That is, due to different width of each of the flow paths formed on two intermediate layers (asymmetry in width of the flow paths), a reverse flow preventing structure may be formed internally of the microchip 100.

Specific exemplary embodiments will be explained below in detail along with reference to the drawings. Herein, in each of the drawings, the same reference numeral is attached to the same component and explanation for them is omitted.

First Exemplary Embodiment

A first exemplary embodiment will be explained in detail with drawings.

Figure 2:
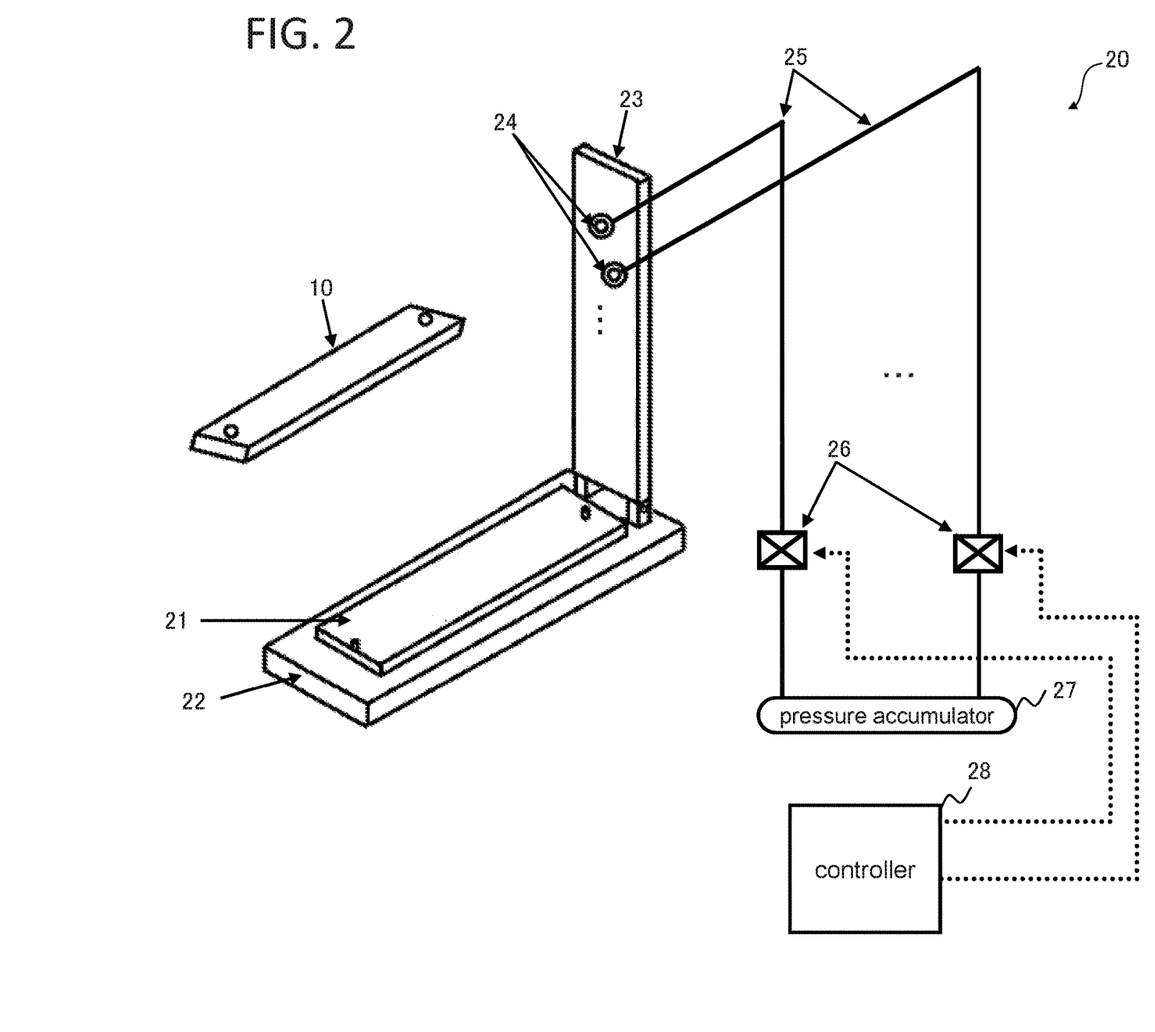
FIG. 2 is a perspective view showing appearance of the exemplary microchip and microchip controlling apparatus according to a first exemplary embodiment.

FIG. 2 is a perspective view showing appearance of a microchip 10 and a microchip controlling apparatus 20 according to the first exemplary embodiment. As shown in FIG. 2, the microchip controlling apparatus 20 comprises a base 22 on which a table 21 is arranged, and a lid 23. For example, in a case where DNA analysis is executed on the microchip 10, a unit for heating sample solution (not shown) and a unit for electrophoresis (not shown) are arranged on the table 21. The base 22 and the lid 23 are connected with a hinge so that the lid 23 may be opened and closed.

The microchip 10 is loaded at a predetermined position on the table 21 by fitting pins arranged on the table 21 with pin holes arranged on the microchip 10. When the lid 23 is closed under a state where the microchip 10 has been loaded on the table 21, predetermined sites on the microchip 10 contact to each unit arranged on the table 21.

A plurality of pressurizing holes 24 are arranged on the lid 23. Region on the lid 23 corresponding to the pressurizing holes 24 are perforated, and the pressurizing holes 24 are connected to the solenoid valves 26 via tubes 25, respectively. In addition, when the lid 23 is closed, the pressurizing holes 24 contact to a variety of control holes on the microchip 10. Herein, it is preferable that the pressurizing holes 24 contact to the control holes with an interposed sealing mechanism, such as O-ring.

A pressure accumulator 27 stores pressurizing medium, such as compressed air. A controller 28 controls a solenoid valve(s) 26 to inject and eject the pressurizing medium into/from the control hole(s) on the microchip 10 via the pressurizing hole(s) 24. Herein, the internal pressure in the pressure accumulator 27 is controlled by a pressure sensor, pump and the like (not shown) so that a predetermined pressure is kept.

Figure 3:
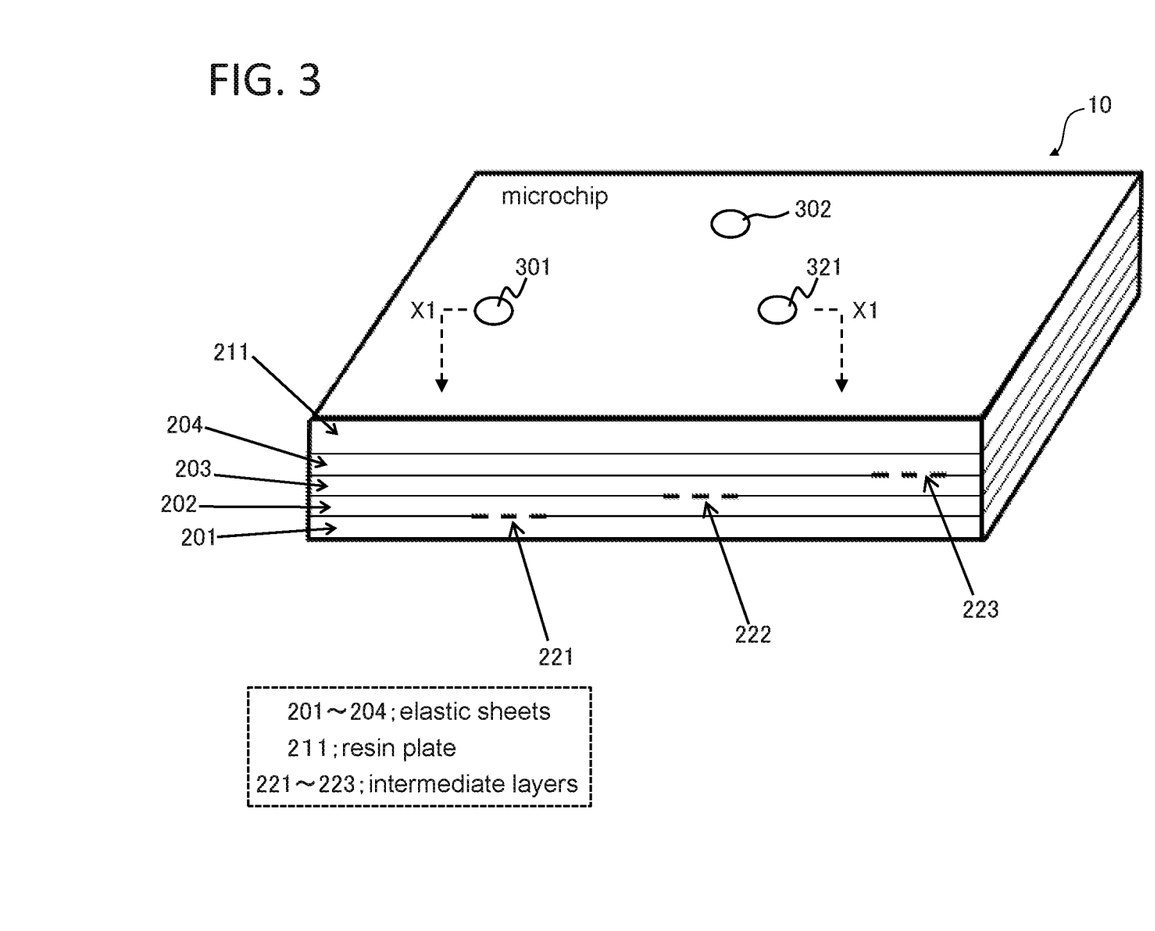
FIG. 3 is a perspective view showing an outline of the exemplary microchip according to the first exemplary embodiment.

FIG. 3 is a perspective view showing an example of the outline of the microchip. Referring to FIG. 3, the microchip 10 is configured of elastic sheets 201 to 204 and a resin plate 211 which are laminated. Specifically, in the microchip 10, the elastic sheet 202 is laminated on the elastic sheet 201, the elastic sheet 203 is laminated on the elastic sheet 202, the elastic sheet 204 is laminated on the elastic sheet 203 and the resin plate 211 is laminated on the elastic sheet 204, respectively. Herein, the construction of the microchip 10 shown in FIG. 3 is merely one example, thus it is not intended to limit the number of the elastic sheets constructing the microchip 10. The number of the elastic sheets may be more or less than 4.

It is preferable that the elastic sheets 201 to 204 contain elastic material, such as silicone rubber, as main material. In addition, it is preferable that the elastic sheets 201 to 204 have heat resistance and acid/alkali resistance. It is preferable that the resin plate 211 is hard to an extent that extension of the elastic sheets 201 to 204 may be controlled.

A part(s) of the elastic sheets 201 to 204 constructing the microchip 10 is (are) inadhesive. Since a part between each of the elastic sheets is inadhesive, the inadhesive section is utilized as the liquid layer or the flow path. That is, a part(s) of 4 elastic sheets 201 to 204 is (are) inadhesive, thus 3 layers as intermediate layers functioning as the liquid layer and the flow path(s) may be formed on the microchip 10.

Hereinafter, in explanation below, the intermediate layer formed between the elastic sheet 201 and the elastic sheet 202 is referred to as first intermediate layer 221, the intermediate layer formed between the elastic sheet 202 and the elastic sheet 203 is referred to as second intermediate layer 222 and the intermediate layer formed between the elastic sheet 203 and the elastic sheet 204 is referred to as third intermediate layer 223. However, it is not intended to limit the number of the intermediate layers formed on the microchip 10. 2 layers as the intermediate layers may be formed by 4 elastic sheets.

In addition, in FIG. 3 and following figures, in a case where elastic sheets are adhesive, boundary of them is represented with solid lines, and in a case where elastic sheets are inadhesive, boundary of them is represented with broken line.

FIG. 4 is a diagram showing concept of a liquid layer and a flow path formed on the microchip. For example, solution injection chambers 301 and 302 and a solution reaction chamber 303 are formed on the microchip 10. The solution injection chambers 301 and 302 are formed as through holes penetrating the resin plate 211 and the like and functions as a liquid layer for injecting liquid into interior of the microchip 10. An operator loads the microchip 10 on the microchip controlling apparatus 20 and then performs injection of required solutions into the solution injection chambers 301 and 302.

The solution injection chamber 301 is connected to the solution reaction chamber 303 via a flow path 311 and the solution injection chamber 302 is connected to the solution reaction chamber 303 via a flow path 312. The solution reaction chamber 303 functions as a liquid layer where liquid transferred from the solution injection chambers 301 and 302 is mixed or subjected to a reaction. The solution reaction chamber 303 is connected to a flow path 313 for transferring mixed solution and the like to anther reaction chamber.

In a case where liquid is transferred from the solution injection chambers 301 and 302 to the solution reaction chamber 303 or in a case where liquid is transferred from the solution reaction chamber 303 to another reaction chamber, pressurizing medium is applied from surface of the microchip 10. For example, referring to FIG. 3, liquid stored in the solution injection chamber 301 is transferred to the solution reaction chamber 303 by applying a pressurizing medium from upper side of the solution injection chamber 301. Similarly, a liquid stored in the solution injection chamber 302 is transferred to the solution reaction chamber 303 by pressurizing from upper side of the solution injection chamber 302.

In a case of transfer of liquid existing in the solution reaction chamber 303, a pressurizing medium is applied to a control hole 321 arranged on the surface of the microchip 10. As described in detail below, the microchip 10 comprises a reverse flow preventing structure on each of flow paths connecting the liquid chambers, thus, even in a case where the pressurizing medium is applied to the control hole 321, the liquid in the solution reaction chamber 303 does not flow reverse to the solution injection chambers 301 and 302.

Next, the solution injection chamber 301, a structure and liquid transfer between the flow path 311 and the solution reaction chamber 303 will be explained.

Figure 5:
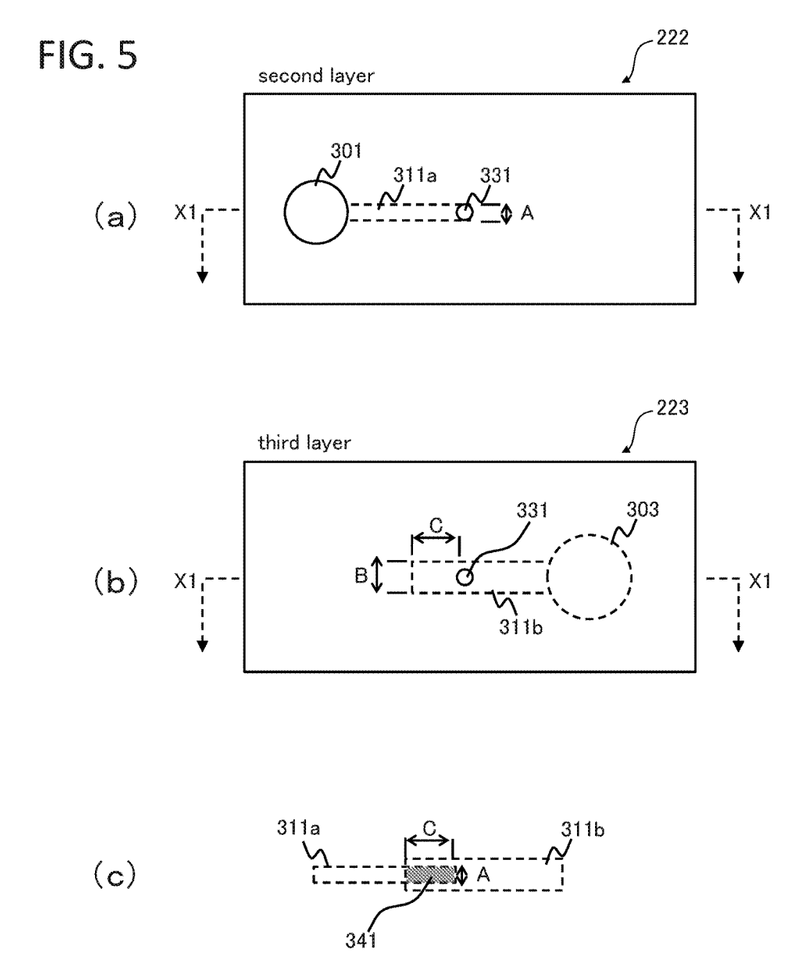
FIG. 5 is a plan view showing examples of a second intermediate layer and a third intermediate layer.

FIG. 5(a) shows an example of plan view of second intermediate layer 222 and FIG. 5(b) shows an example of plan view of third intermediate layer 223.

The solution injection chamber 301 is formed by perforation on the resin plate 211, the elastic sheet 203 and the elastic sheet 204. A surface of the elastic sheet 202 is a bottom part of the solution injection chamber 301. The solution reaction chamber 303 is formed at an inadhesive section (third intermediate layer 223) between the elastic sheet 203 and the elastic sheet 204.

The solution injection chamber 301 and the solution reaction chamber 303 are connected by the flow path 311. The flow path 311 is formed on 2 intermediate layers in a bridged manner. Specifically, a part of the flow path 311 is formed as a flow path 311a on the second intermediate layer 222. In addition, a part of the flow path 311 is formed as a flow path 311b on the third intermediate layer 223. The flow path 311a and the flow path 311b are connected by a connection hole 331 disposed through the elastic sheet 203.

Herein, the flow path width of the flow paths 311a and 311b (width of inadhesive sections to be flow paths) are different from one another. Specifically, the inadhesive sections between the elastic sheets are arranged so that flow path width A at the connection hole 331 of the flow path 311a is narrower than flow path width B at the connection hole 331 of the flow path 311b.

In addition, the flow path 311b formed on the third intermediate layer 223 branches into 2 flow paths from the connection hole 331 as a starting point. One branched flow path is connected to the solution reaction chamber 303. The other branched flow path is a dead end flow path having no communication destination. Furthermore, the dead end flow path of the flow path 311b is formed in a manner covering a part of the flow path 311a in plan view. Referring to FIG. 5(c), a rectangle having the flow path width A of the flow path 311a and length C of the dead end flow path forms an overlapped section 341 of the upper and lower flow paths.

Figure 6:
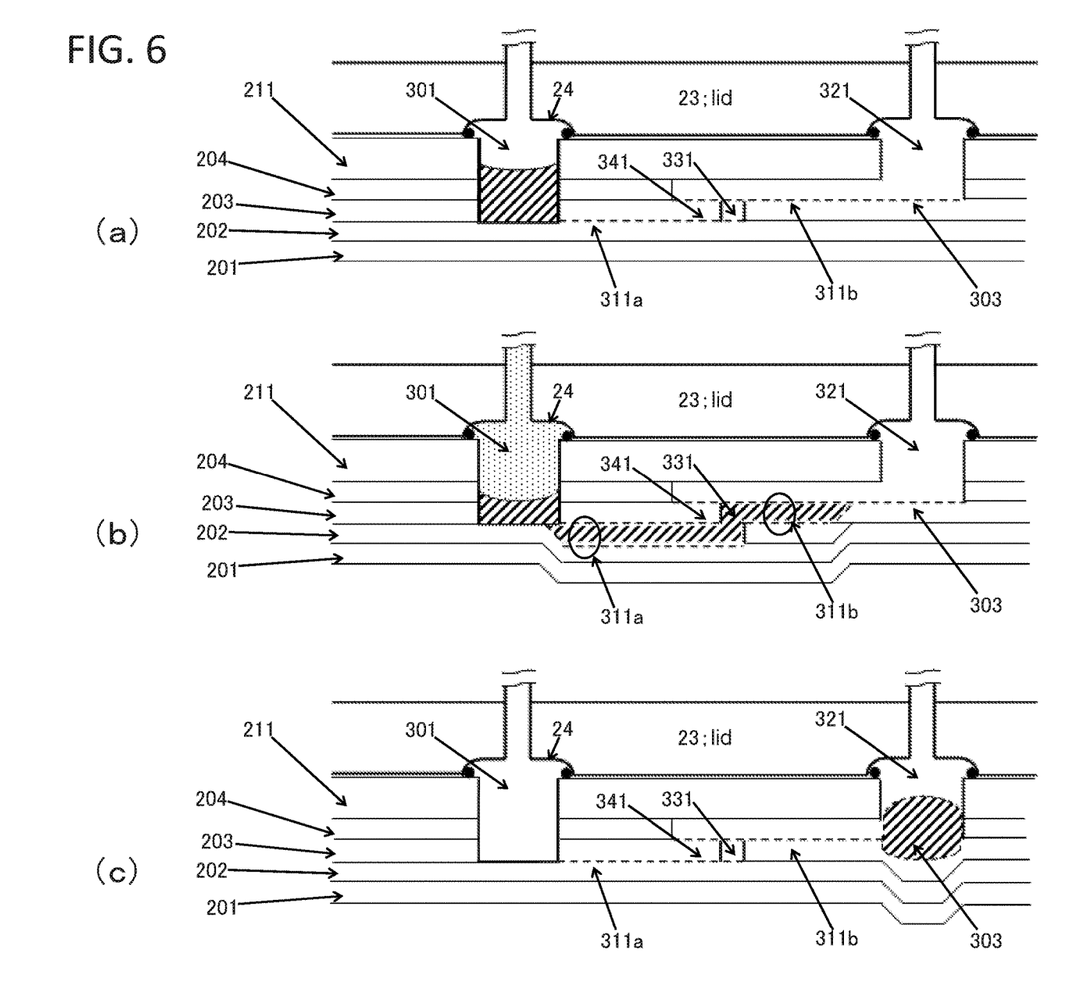
FIG. 6 is a diagram showing an example of schematic sectional view of X1-X1 shown in FIGS. 3 and 5.

FIG. 6 is a diagram showing an example of schematic sectional view of X1-X1 shown in FIGS. 3 and 5. FIG. 6(a) shows a state before pressurization to the solution injection chamber 301. FIG. 6(b) shows a state under pressurization to the solution injection chamber 301. FIG. 6(c) shows a state after pressurization to the solution injection chamber 301.

Referring to FIG. 6(a), since the flow path 311a is formed on the second intermediate layer 222, the flow path 311a is formed in an inadhesive section between the elastic sheet 202 and the elastic sheet 203. Similarly, since the flow path 311b is formed on the third intermediate layer 223, the flow path 311b is formed in an inadhesive section between the elastic sheet 203 and the elastic sheet 204. In addition, the solution reaction chamber 303 is formed in an inadhesive section between the elastic sheet 203 and the elastic sheet 204.

When the pressurizing medium is applied to the solution injection chamber 301 under the state shown in FIG. 6(a), the liquid stored in the solution injection chamber 301 flows into the flow path 311 (see FIG. 5(b)). Specifically, the pressurized liquid presses down the elastic sheet 202 providing the flow path 311a and moves to connection hole 331.

After that, the pressurized liquid flows into flow path 311b through the connection hole 331. At that situation, the pressurized liquid presses down the elastic sheet 203 providing the flow path 311b and moves to the solution reaction chamber 303. After that, when the inadhesive section between the elastic sheets 203 and 204 is filled up with the pressurized liquid, the solution reaction chamber 303 is formed (see FIG. 6(c)).

Then, it will be explained a case where the solution reaction chamber 303 is pressurized via a control hole 321 for a purpose of transfer of the liquid stored in the solution reaction chamber 303 to another liquid chamber and the like. When the solution reaction chamber 303 is pressurized, since the flow path 311b and the solution reaction chamber 303 are connected, there is a case where liquid flows out to the flow path 311b.

Figure 7:
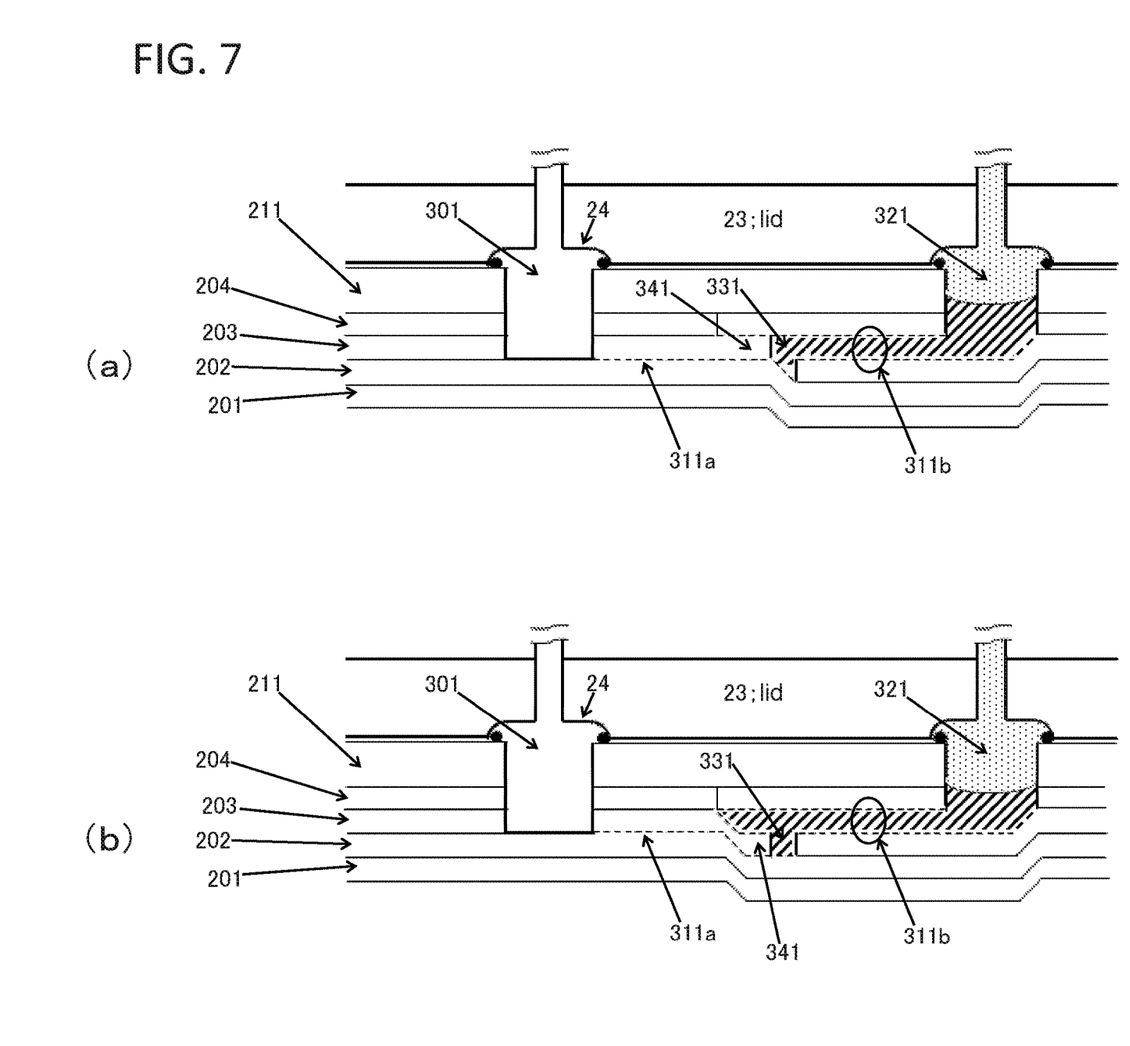
FIG. 7 is a diagram showing an example schematic sectional view of X1-X1 shown in FIGS. 3 and 5.

Referring to FIG. 7(a), the flow path 311b is filled up with liquid extruded from the solution reaction chamber 303 (pressurized liquid). At that situation, the pressurized liquid reaches else the connection hole 331.

Herein, the flow path 311a and the flow path 311b have different flow path width from one another (see FIG. 5). Thus, force F1 required for flowing the liquid into the flow path 311a and forth F2 required for flowing the liquid into the flow path 311b has a relationship: F1>F2. This relationship would be understood if one considers a case where the flow path 311a having the flow path width A is expanded at length L and a case where the flow path 311b having the flow path width B is expanded at length L.

In such case, change value in the flow path 311a per unit length is L/A. On the other hand, change value in the flow path 311b per length is L/B. Since flow path width B>(is larger than) flow path width A, change value in the flow path 311a per unit length is larger than that of the flow path 311b. Therefore, when respective of the flow paths 311a and 311b are expanded at the same length L, the flow path 311a provides a larger repulsive force. That is, the flow path 311b having broader flow path width is easily expanded rather than the flow path 311a having narrower flow path width.

In other words, if pressure required for flowing the liquid into between the elastic sheets 202 and 203 forming the flow path 311a is applied to the solution injection chamber 301, the liquid would also flow into (an interface) between the elastic sheets 203 and 204. On the other hand, even if the liquid may flow into between the elastic sheets 203 and 204 (even if the flow path 311b may be formed), there would be a case where the liquid may not flow into (an interface) between the elastic sheet 202 and 203 under such pressure (there would be a case where the flow path 311a may not be formed).

The situation shown in FIG. 7(a) corresponds to such state. That is, asymmetric property that the flow path 311a and the flow path 311b have different flow path width respectively provides difference in force required for formation of respective of flow paths (difference in depressing pressure) so that it is prevented that the pressurized liquid flows reverse. That is, the flow path width at an upstream side upon causing flow of the liquid (for example, the flow path width A of the flow path 311a) is narrower and the flow path width at a downstream side (for example, the flow path width B of the flow path 311b) is broader, such construction may provide the reverse flow preventing structure in the interior of the microchip 10.

Accordingly, in the microchip of first exemplary embodiment, asymmetric property in flow path width of 2 flow paths prevents reverse flow of liquid. Therefore, in a case where the pressure applied to the solution reaction chamber 303 is weaker than a force required for formation of the flow path 311a, reverse flow of the pressurized liquid may be prevented without presence of the overlapped section 341 between the flow path 311a and the flow path 311b. That is, when the flow path width A of the flow path 311a is designed considerably narrow and the flow path width B of the flow path 311b is designed considerably broad, reverse flow of pressurized liquid may be prevented.

In a case where a stronger pressure is applied to the solution reaction chamber 303 than the situation shown in FIG. 7(a), the dead end flow path of the flow path 311b is also filled up with the pressurized liquid. As a result, region on the elastic sheet 203 corresponding to the overlapped section 341 between the flow path 311a and the flow path 311b is pressed down (see FIG. 7(b)). Due to pressing down of the elastic sheet 203 at the overlapped section 341, the corresponding flow path 311a is also pressed down.

Accordingly, a part of the elastic sheet 203 is pressed down so that the pressed elastic sheet 203 functions as the reverse flow prevention valve. As a result, the pressurized liquid does not flow reverse to the solution injection chamber 301. Herein, in a case where the pressure applied to the solution reaction chamber 303 is increased, the force for flowing the liquid into between the elastic sheet 202 and the elastic sheet 203 is increased. However, if the pressure applied to the solution reaction chamber 303 is increased, a force pressing down the elastic sheet 203 would be also increased, thus the liquid does not flow reverse to the solution injection chamber 301. That is, the dead end flow path of the flow path 311b is filled up with the pressurized liquid to press down the elastic sheet 203. Such force pressing down the elastic sheet 203 increases the difference in the depressing pressure due to the difference in flow path width of the flow path 311a and the flow path 311b, thus a tighter reverse flow reverse flow prevention structure is formed.

Figure 8:
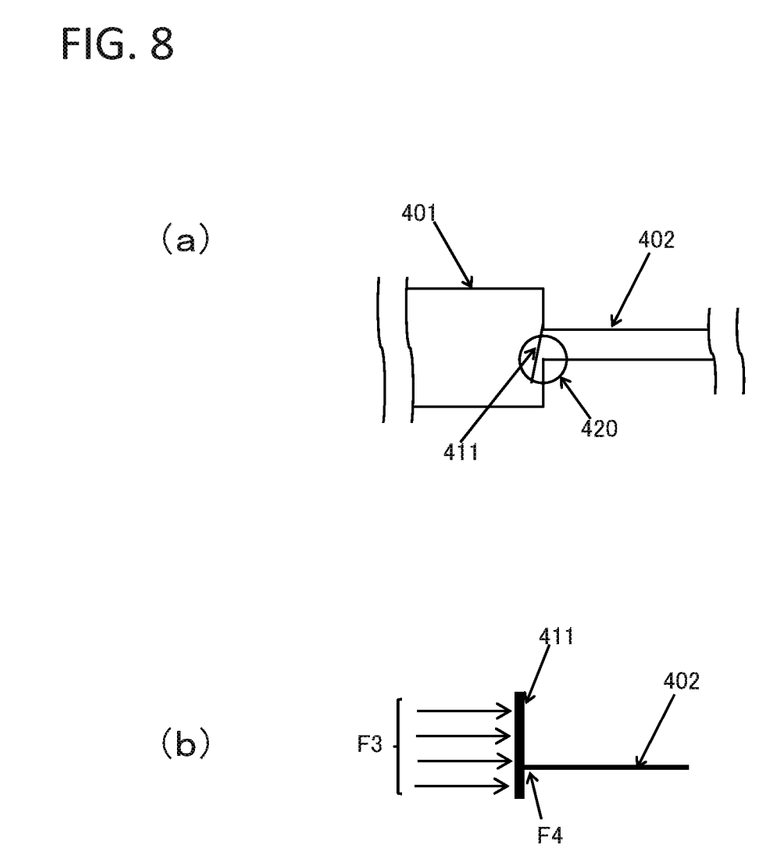
FIG. 8 is an explanatory view of a reverse flow prevention valve structure.

Herein, the reverse flow prevention valve structure is similar to a construction where tubes having different diameters are connected and a valve is arranged at the connecting section. For example, as shown in FIG. 8(a), a structure is considered, where a tube 401 and tube 402 having different diameters are connected and a valve 411 is arranged at the connecting section. In FIG. 8(a), in a case where liquid flows from the tube 402 to the tube 401, the valve 411 is opened and the liquid flows. On the other hand, in a case where the liquid flows from the tube 401 to the tube 402, the valve 411 is closed and the liquid does not flow. FIG. 8(b) is an enlarged view of encircled region 420 in FIG. 8(a). Referring to FIG. 8(b), in a case where the liquid flows from the tube 401 to the tube 402, force F3 is applied to the valve 411. Simultaneously, force F4 is also applied to a gap between the valve 411 and the tube 402. Under such situation, force F3 is stronger than force F4, thus the liquid does not flow into the tube 402. In addition, in a case where the liquid stored in the tube 401 is pressurized, force F3 and force F4 are also increased, thus the liquid does not flow into the tube 402. That is, in a case where higher pressure is applied to the liquid stored in the tube 401 for a purpose of opening the valve 411, force F4 for opening the valve 411 is increased, but force F3 for closing the valve 411 is also simultaneously increased, thus the liquid does not flow into the tube 402.

Accordingly, the microchip 10 of the first embodiment has asymmetric property that the 2 flow paths formed on different intermediate layers have different widths. Such difference in the flow path width provides a first reverse flow preventing structure preventing reverse flow of liquid. In addition, the microchip 10 comprises a flow path having broader flow path width above a flow path having narrower flow path width, thus comprising an overlapped section where 2 flow paths are overlapped. The overlapped section is filled up with the liquid which has flowed through the flow path having the broader flow path width so that the elastic sheet 203 is pressed down. The elastic sheet 203 pressed down by the liquid which has flowed reverse provides a second reverse flow preventing structure preventing reverse flow of the liquid.

The microchip controlling apparatus 20 of the first embodiment may execute a step of transferring liquid from the flow path 311a (first flow path) to the flow path 311b (second flow path) thorough the connection hole 331 and a step of interrupting liquid transfer from the flow path 311b to the flow path 311a (a step of preventing reverse flow of the liquid) by utilizing the microchip 10 having the first and second reverse flow preventing structures.

Herein, the structure of the microchip 10 explained in the first exemplary embodiment is an example, thus various modifications may be considered. For example, the connecting section connecting the upper/lower flow paths 311a and 311b is not limited to cylindrical shape like as the connection hole 331. For example, the connecting section may be of a slit shape formed by a cutout of the elastic sheet 203 interposed between the flow path 311a and the flow path 311b.

The microchip 10 of first embodiment has a structure where a resin plate 211 is further laminated on 4 elastic sheets 201 to 204. However, the microchip 10 may has a structure where 4 elastic sheets 201 to 204 are sandwiched by 2 resin plates. In such case, space part is provided above or below the inadhesive section on the elastic sheets providing a flow path so as to ensure the space part for forming the flow path in the interior of the microchip 10.

In addition, in first exemplary embodiment, it has been explained on a case where an intermediate layer on which the flow path 311a is formed (second intermediate layer 222) and an intermediate layer on which the flow path 311b is formed (third intermediate layer 223) are adjacent in vertical direction. However, it is unnecessary that the intermediate layers on which 2 flow paths are formed are adjacent. For example, it is allowed that one flow path is formed on the first intermediate layer 221 and the other flow path is formed on the third intermediate layer 223. Furthermore, it is unnecessary that the solution reaction chamber 303 as a connection destination of the flow path 311b is formed on the same intermediate layer (third intermediate layer 223) as the flow path 311b.

In the first exemplary embodiment, it has been explained on a case where an upstream flow path 311a is formed on the lower intermediate layer (second intermediate layer 222) and a downstream flow path 311b is formed on an upper intermediate layer (third intermediate layer 223). However, it is allowable that the upstream flow path 311 is formed on the upper intermediate layer and the downstream flow path 311b is formed on the lower intermediate layer.

Figure 9:
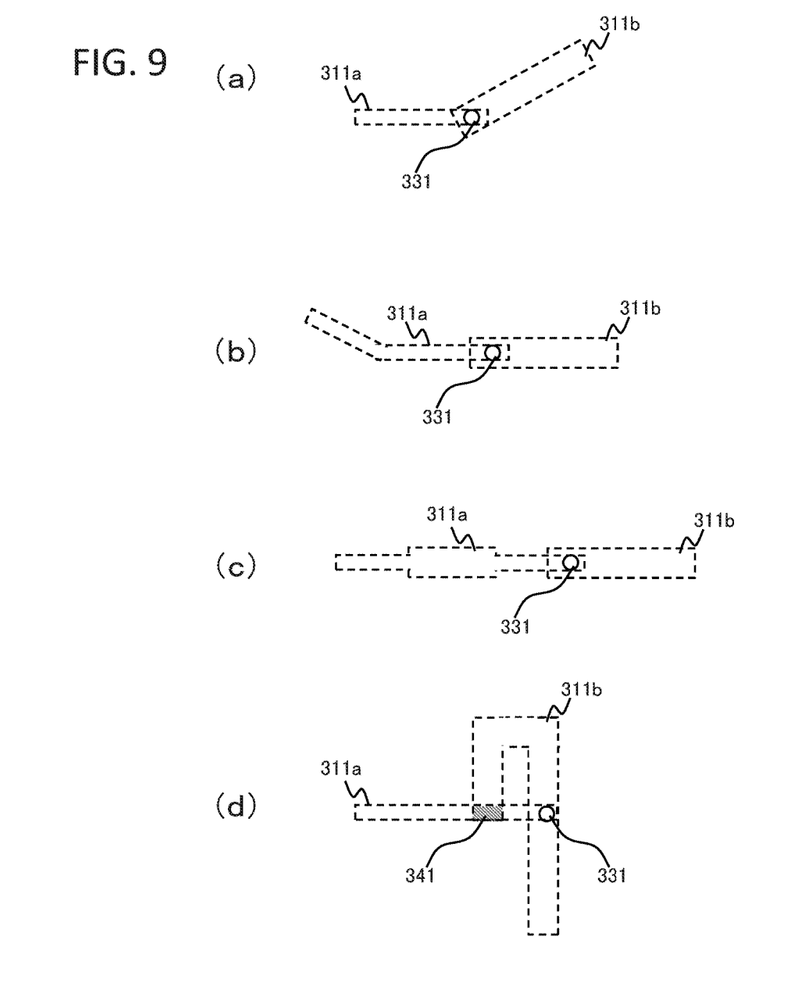
FIG. 9 is an explanatory view of connection configuration of two flow paths.

In addition, in the first exemplary embodiment, it is explained a case where the flow paths 311a and 311b are formed on a straight line in plan view, but 2 flow paths may extend in any directions. For example, as shown in FIG. 9(a), 2 flow paths may cross obliquely. In addition, it is unnecessary that the flow paths themselves are straight (FIG. 9(b)). Furthermore, it is unnecessary that the flow paths 311a and 311b have a constant flow path width, thus the width may be modified at a middle section of the flow path. Furthermore, it is unnecessary that the overlapped section 341 and the connection hole 331 are adjacent. For example, as shown in FIG. 9(d), a dead end flow path branched from the connection hole 331 (a part of flow path 311b) overlaps with the flow path 311a at a place away from the connection hole 331.

Part or all of the above described embodiments may be expressed as following modes, but not limited thereto.

[Mode 1]

A microchip comprising a plurality of laminated elastic sheets, wherein each of elastic sheets forming first intermediate layer as a intermediate layer formed by the plurality of elastic sheets comprises an inadhesive section(s) for forming first flow path on the first intermediate layer, each of elastic sheets forming second intermediate layer as an intermediate layer formed by the plurality of laminated elastic sheets comprises an inadhesive section(s) for forming a second flow path on the second intermediate layer, an elastic sheet(s) interposed between the first and second intermediate layers comprises a connecting section(s) connecting the first flow path and the second flow path, and the flow path width at the connecting section(s) on the first flow path is narrower than the flow path width at the connecting section(s) on the second flow path.

[Mode 2]

The microchip according Mode 1, wherein the second flow path branches into 2 flow paths at the connecting section as a starting point, one branched flow path is a flow path having a dead end and a part of the dead end flow path is superposed on the first flow path in plan view.

[Mode 3]

The microchip according to Mode 2, wherein the first flow path is connected with a liquid injection layer formed in a penetrating manner through a part of the plurality of sheet at one end different from a connection with the connecting section(s), the other branched flow path of the second flow path is connected with a liquid layer formed on a third intermediate layer as a intermediate layer formed by the plurality of laminated elastic sheets.

[Mode 4]

The microchip according to any one of Modes 1 to 3, wherein the first intermediate layer and second intermediate layer are adjacent to one another, and the connecting section(s) is formed on 1 elastic sheet interposed between the first and second intermediate layers.

[Mode 5]

A microchip comprising a plurality of laminated elastic sheets, wherein a plurality of intermediate layers are formed between the plurality of laminated elastic sheets and first flow path and second flow paths are respectively formed on first intermediate layer and second intermediate layer, the first and second flow paths are connected by a connecting section(s) penetrating elastic sheet interposed between the first and second intermediate layers, the microchip comprises a reverse flow preventing structure which allows liquid transfer from the first flow path to the second flow path through the connecting section(s) and which does not allow liquid transfer from the second flow path to the first flow path through the connecting section(s).

[Mode 6]

The microchip according to Mode 5, wherein the reverse flow preventing structure has a first flow path width at the connecting section of the first flow path, and a second flow path width which is at the connecting section of the second flow path and being different from the first flow path width.

[Mode 7]

The microchip according to Mode 5 or 6, wherein the reverse flow preventing structure comprises a region where the first and second flow paths are overlapped in plan view.

[Mode 8]
A liquid transfer method on a microchip, wherein
the microchip comprises a plurality of laminated elastic sheets,
a plurality of intermediate layers are formed between the plurality of laminated elastic sheets,
first flow path and second flow paths are respectively formed on first intermediate layer and second intermediate layer,
the first and second flow paths are connected by a connecting section(s) penetrating an elastic sheet interposed between the first and second intermediate layers,
the method comprises:
a step of liquid transfer from the first flow path to the second flow path through the connecting section(s), and
a step of interrupting liquid transfer from the second flow path to the first flow path.
[Mode 9]
A microchip controlling apparatus, wherein
on the microchip according to any one of Modes 1 to 7,
liquid transfer from first liquid layer connected to the first flow path to second liquid layer connected to the second flow path is controlled.

The disclosures of the above mentioned Patent Literature is to be incorporated herein by reference. The exemplary embodiments or Examples may be modified or adjusted within the concept of the entire disclosures of the present invention, inclusive of claims, based on the fundamental technical concept of the invention. A series of combinations or selections of elements herein disclosed (elements of claims, Examples and drawings) may be made within the context of the claims of the present invention. That is, the present invention may include a wide variety of changes or modifications that may occur to those skilled in the art in accordance with the entire disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

10, 100 microchip
20 microchip controlling apparatus
21 table
22 base
23 lid
24 pressurizing hole
25 tube
26 solenoid valve
27 pressure accumulator
28 controller
101 first elastic sheet
102 second elastic sheet
103 fourth elastic sheet
104 first flow path
105 second flow path
106 connecting section
201 to 204 elastic sheets
211 resin plate
221 to 223 intermediate layers
301, 302 solution injection chambers
303 solution reaction chamber
311, 311a, 311b, 312, 313 flow paths
321 control hole
331 connection hole
341 overlapped section
401, 402 tubes
411 valve
420 region

What is claimed is:

1. A microchip, comprising: a plurality of laminated elastic sheets, wherein
each of elastic sheets forming a first intermediate layer as an intermediate layer formed by the plurality of laminated elastic sheets comprises an inadhesive section for forming a first flow path on the first intermediate layer,
each of elastic sheets forming a second intermediate layer as an intermediate layer formed by the plurality of laminated elastic sheets comprises an inadhesive section for forming a second flow path on the second intermediate layer,
at least one elastic sheet interposed between the first and second intermediate layers comprises at least one connecting section connecting the first flow path and the second flow path, the at least one connecting section being configured to prevent a reverse flow from the second flow path to the first flow path,
a flow path width at the at least one connecting section on the first flow path is narrower than a flow path width at the at least one connecting section on the second flow path, whereby the prevention of reverse flow by the at least one connecting section is accomplished, and
the first flow path and the second flow path overlap one another at a first position where the first and second flow paths are connected with the connecting section and at a second position spaced away from the first position, the second position being where a dead end of the second flow path is superposed on the first flow path,
wherein
the dead end of the second flow path is inflated by being filled up with liquid, and
the elastic sheets forming the first intermediate layer are brought into contact with one another so as to close the first flow path by inflation of the dead end of the second flow path.

2. The microchip according claim 1, wherein the second flow path branches into two flow paths at the at least one connecting section as a starting point, one branched flow path of the two flow paths being a flow path having the dead end.

3. The microchip according to claim 2, wherein
the first flow path is connected with a liquid injection layer formed in a penetrating manner through a part of the plurality of laminated elastic sheets at one end different from another end having a connection with the at least one connecting section,
the other branched flow path of the second flow path being connected with a liquid layer formed on a third intermediate layer as an intermediate layer formed by the plurality of laminated elastic sheets.

4. The microchip according to claim 1, wherein the first intermediate layer and the second intermediate layer are adjacent to one another, and the at least one connecting section is formed on one elastic sheet interposed between the first and second intermediate layers.

5. A microchip controlling apparatus, wherein
on microchip according to claim 1,
liquid transfer from a first liquid layer connected to the first flow path to a second liquid layer connected to the second flow path is controlled.

* * * * *